(12) United States Patent
Borsoi et al.

(10) Patent No.: US 10,791,612 B2
(45) Date of Patent: Sep. 29, 2020

(54) COMMISSIONING OF ONE OR MORE INSTALLED DEVICES OF A LIGHTING SYSTEM

(71) Applicant: TRIDONIC GMBH & CO KG, Dornbirn (AT)

(72) Inventors: Giulio Borsoi, Dornbirn (AT); Abhinav Somaraju, Mont-sur-Rolle (CH)

(73) Assignee: TRIDONIC GMBH & CO KG, Dornbirn (AT)

(*) Notice: Subject to any disclaimer, the term of this patent is extended or adjusted under 35 U.S.C. 154(b) by 0 days.

(21) Appl. No.: 16/470,641

(22) PCT Filed: Dec. 18, 2017

(86) PCT No.: PCT/EP2017/083293
§ 371 (c)(1),
(2) Date: Jun. 18, 2019

(87) PCT Pub. No.: WO2018/114789
PCT Pub. Date: Jun. 28, 2018

(65) Prior Publication Data
US 2020/0022242 A1    Jan. 16, 2020

(30) Foreign Application Priority Data

Dec. 21, 2016    (GB) .................................. 1622346.3

(51) Int. Cl.
*H05B 47/19*    (2020.01)
*H04W 4/70*    (2018.01)
(Continued)

(52) U.S. Cl.
CPC .............. *H05B 47/19* (2020.01); *H04W 4/70* (2018.02); *H05B 45/10* (2020.01); *H05B 45/20* (2020.01)

(58) Field of Classification Search
None
See application file for complete search history.

(56) References Cited

U.S. PATENT DOCUMENTS 10,433,404 B2 * 10/2019 Jonsson ............ H05B 37/0272
2011/0031897 A1    2/2011 Henig et al.
(Continued)

FOREIGN PATENT DOCUMENTS

| WO | 2007029186 | 3/2007 |
| WO | 2013057626 | 4/2013 |
| WO | 2015104248 | 7/2015 |

OTHER PUBLICATIONS

Whitepaper entitled "Thread Stack Fundamentals"; Thread Group, (Year: 2015).*

(Continued)

*Primary Examiner* — Dedei K Hammond
(74) *Attorney, Agent, or Firm* — Andrus Intellectual Property Law

(57) ABSTRACT

The invention refers to a communication module arranged to support execution of commissioning of one or more installed devices and configured to transmit, according to Thread network protocol, via multiple channels a connectivity verification message arranged to initiate an execution of a predetermined activity by the one or more installed devices. Present invention concerns a commissioning device, transmitting the connectivity verification message to the one or more installed devices via the communication module, and installed devices, each installed device monitoring received messages, determining whether or not a received message is the connectivity verification message, determining whether or not a signal strength of the received message is above a predetermined threshold, if the received message is a connectivity verification message and if the signal strength of the received message is above the predetermined threshold, (Continued)

executing the predetermined activity. Further, the invention concerns a managing device supporting the execution of said commissioning.

11 Claims, 1 Drawing Sheet

(51) Int. Cl.
*H05B 45/20* (2020.01)
*H05B 45/10* (2020.01)

(56) References Cited

U.S. PATENT DOCUMENTS

| | | | |
|---|---|---|---|
| 2012/0082062 A1* | 4/2012 | Mccormack | H04W 48/14 370/254 |
| 2012/0091896 A1 | 4/2012 | Schenk et al. | |
| 2012/0200226 A1 | 8/2012 | Knibbe et al. | |
| 2015/0372875 A1 | 12/2015 | Turon et al. | |
| 2016/0037614 A1 | 2/2016 | Setomoto et al. | |
| 2016/0270193 A1 | 9/2016 | Lawrenson et al. | |
| 2017/0230364 A1* | 8/2017 | Barile | G06T 7/20 |

OTHER PUBLICATIONS

Whitepaper entitled "Thread Stack Fundamentals" from http://threadgroup.org as cited in International Search Report in parent application PCT/EP2017/083293.

Whitepaper entitled "Thread Commissioning" from http://threadgroup.org as cited in International Search Report in parent application PCT/EP2017/083293.

International Search Report dated Apr. 18, 2018 in parent PCT application PCT/EP2017/083293.

Great Britain search report dated Jun. 20, 2017 in priority GB application 1622346.3.

\* cited by examiner

COMMISSIONING OF ONE OR MORE INSTALLED DEVICES OF A LIGHTING SYSTEM

CROSS REFERENCE TO RELATED APPLICATIONS

The present application is the U.S. national stage application of international application PCT/EP2017/083293 filed Dec. 18, 2017, which international application was published on Jun. 28, 2018 as international publication WO 2018/114789 A1. The international application claims priority to Great Britain patent application 1622346.3 filed Dec. 21, 2016.

FIELD OF THE INVENTION

The present invention relates to commissioning of one or more installed devices (e.g. lighting devices of a lighting system). Particularly, the present invention refers to a communication module, arranged to support an execution of commissioning of one or more installed devices, to a commissioning device configured to execute said commissioning, to a device arranged for undergoing the commissioning process after an installation of the device, and to a managing device arranged to support the execution of the commissioning of the one or more installed device.

BACKGROUND OF THE INVENTION

When one or more devices (e.g. building technology devices such as e.g. lighting devices) have been installed, their operation has to be evaluated, i.e. a commissioning of the one or more installed devices has to be executed. Particularly, by the commissioning, it is examined and determined whether or not the installed devices operate properly and as desired. Here, the operation and the functions of the installed devices are examined.

Often, the devices are installed by installers that do not have a profound knowledge on the operation and functions of the installed devices. Frequently, a plurality of devices are installed at once and certain time passes until, after the installation of the devices, the commissioning is executed. In such cases, only rough information on locations of the installed devices is present.

Thus, commissioning tools are required that are easy to handle and that enable detection and commissioning of all installed devices.

SUMMARY OF THE INVENTION

In view of the aforesaid, the object of the present invention is to enable an improved commissioning of installed devices. Particularly, a commissioning of installed devices is desired that is easy to handle and that is able to detect and commission all installed devices.

The object of the present invention is solved by features described herein.

The present invention is based on the utilization of the Thread network protocol. Thread is an Internet Protocol version 6 (IPv6) based networking protocol. It has been initially developed as networking protocol for Internet of Things (IoT) "smart" home automation devices to communicate on a local wireless mesh network. The development of the Thread network protocol is promoted by the "Thread Group" alliance (https://www.threadgroup.org). Thread uses 6LoWPAN (IPv6 over Low power Wireless Personal Area Network), which in turn uses the IEEE 802.15.4 wireless protocol with mesh communication, as does ZigBee and other systems. Thread is IP-addressable, has cloud access and Advanced Encryption Standard (AES) encryption. It supports a plurality of devices in one local network mesh. See for further information also the Thread (network protocol) entry of the free encyclopedia Wikipedia: https://en.wikipedia.org/wiki/Thread_(network_protocol)

Thread network protocol allows a secure and reliable communication between devices. Particularly, Thread is a network protocol for reliable, cost-effective, low-power, wireless D2D (device-to-device) communication. It has been designed specifically for Connected Home applications where IP-based networking is desired and a variety of application layers can be used on the stack. The use of Thread network protocol has, for example, at least one of the following advantages: Thread allows a simple forming, joining, and maintaining of a Thread communication network; Thread allows secure communication, where devices join the Thread communication network only if they are authorized and where all communications are encrypted and secure; Thread allows efficient communication in both small and large networks; secure and reliable operation is ensured in a Thread communication network even with failure or loss of individual devices; the Thread communication is power saving, i.e. low power communication. By utilizing the Thread communication, the present invention takes over the advantages of the Thread standard with regard to the communication between the commissioning devices/modules and the installed devices.

Further, because Thread has been developed for D2D communication, e.g. for devices involved in an Internet of Things (IoT) network, the commissioning devices often do not have the capability of being involved into the Thread communication network. Most of the commissioning devices are portable, i.e. mobile commissioning devices (e.g. tablets, mobile phones, smartphones, etc.). One of the ideas of the present invention is to allow also such commissioning devices to share the benefits of the Thread communication. Even if the commissioning device does not become a full member of the Thread communication network, it becomes access to the Thread communication network that comprises the installed devices and allows the installed devices to communicate via the Thread communication network.

According to an aspect of the present invention, a communication module is provided that is arranged to support an execution of a commissioning of one or more installed devices, wherein the communication module is configured to transmit, according to Thread network protocol, a connectivity verification message via multiple channels, wherein the connectivity verification message is arranged to initiate an execution of a predetermined activity by the one or more installed devices.

According to an embodiment of the present invention, the communication module is arranged for connection with a commissioning device that is configured to execute the commissioning of the one or more installed devices.

According to an aspect of the present invention, a device is provided that is arranged for undergoing a commissioning process after an installation of the device, wherein the device is configured to: monitor received messages; determine whether or not a received message is a connectivity verification message that has been transmitted according to Thread network protocol; determine whether or not a signal strength of the received message is above a predetermined threshold; if the received message is a connectivity verification message that has been transmitted according to Thread network protocol and if the signal strength of the received message is above the predetermined threshold, execute a predetermined activity.

According to an embodiment of the present invention, the device is configured to monitor messages that have been received via a predetermined channel.

According to an embodiment of the present invention, the device is a lighting device and wherein the predetermined activity comprises at least one of the following: dimming; dimming to a predetermined dimming level; change a light color; change the light color to a predetermined light color; change a light temperature; change the light temperature to a predetermined light temperature; blink; blink a predetermined number of times; switch on; switch off; output an audible signal.

According to an embodiment of the present invention, the device is configured to execute the predetermined activity for a predetermined time.

According to an embodiment of the present invention, if the received message is a connectivity verification message that has been transmitted according to Thread network protocol and if the signal strength of the received message is above the predetermined threshold, the device is configured to transmit a commissioning information message to a managing device.

According to an embodiment of the present invention, the commissioning information message indicates the signal strength of the received message.

According to an aspect of the present invention, a commissioning device is provided that is configured to execute commissioning of one or more installed devices, wherein the commissioning device is arranged for connection with a communication module as described herein, wherein the commissioning device is arranged to transmit the connectivity verification message to the one or more installed devices via the communication module.

According to an embodiment of the present invention, the commissioning device comprises a user interface arrangement configured to trigger the transmission of the connectivity verification message to the one or more installed devices.

According to an embodiment of the present invention, the user interface arrangement is configured to receive user input and to trigger the transmission of the connectivity verification message according to the user input.

According to an embodiment of the present invention, the user interface arrangement is configured to visualize information on the installed devices.

According to an embodiment of the present invention, the commissioning device is configured to receive a commissioning status message from a managing device, wherein the commissioning status message indicates a set of installed devices of the one or more installed devices that received the connectivity verification message with a signal strength that is above a predetermined threshold.

According to an embodiment of the present invention, the user interface arrangement is configured to visualize the set of installed devices.

According to an aspect of the present invention, a managing device is provided that is arranged to support an execution of a commissioning of one or more installed devices, wherein the managing device is configured to: receive from an installed device a commissioning information message, wherein the commissioning information message indicates a signal strength of a connectivity verification message received at the installed device from a commissioning device; and transmit to the commissioning device a commissioning status message indicating whether or not the installed device received the connectivity verification message with a signal strength that is above a predetermined threshold.

The above-described aspects and implementation forms of the present invention will be explained in the following description of specific embodiments in relation to the enclosed drawing, in which

DETAILED DESCRIPTION

Figure 1:
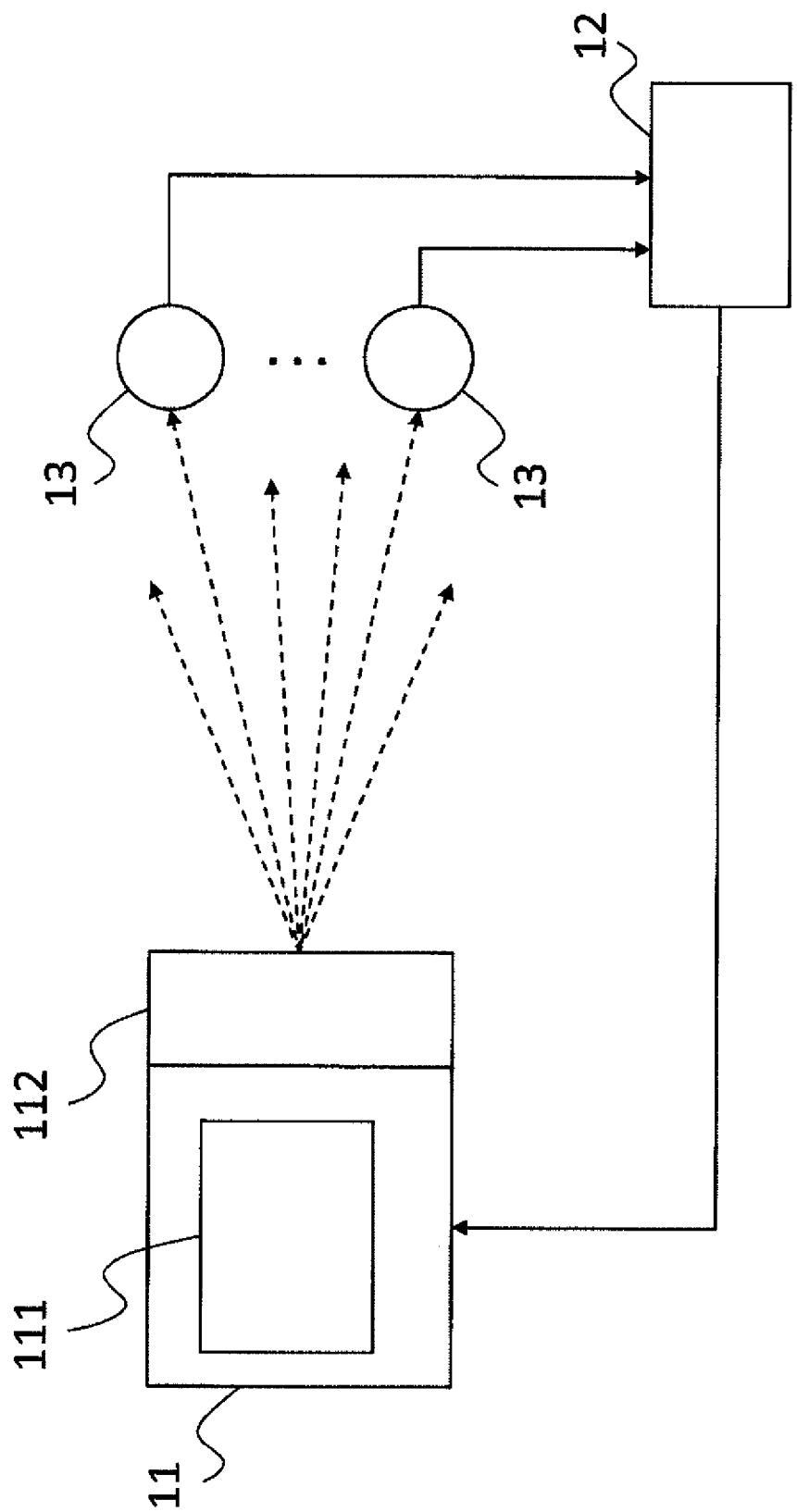
FIG. 1 visualizes commissioning of installed devices according to an embodiment of the present invention.

Generally, it has to be noted that all arrangements, devices, modules, components, models, elements, units, entities, and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present invention and its various steps are embodied in the functionalities of the various described apparatus elements.

Moreover, any of the embodiments and features of any of the embodiments, described herein, may be combined with each other, unless a combination is explicitly excluded.

FIG. 1 visualizes commissioning of installed devices 12 according to an embodiment of the present invention.

In FIG. 1, a commissioning device 11 is configured to execute commissioning of one or more installed devices 13. The one or more installed devices 13 are or comprise, for example, devices of building technology. According to an embodiment the one or more installed devices 13 are or comprise one or more lightning devices such as light emitting diodes (LEDs). The one or more installed devices 13 are configured to communicate by use of the Thread network protocol. Particularly, the one or more installed devices are part of the Thread communication network. Thus, each one of the one or more installed devices 13 is arranged to receive and/or transmit data by use of the Thread network protocol. The data comprises, for example, states, activities and/or error indications of the one or more installed devices 13 and/or commands to the one or more installed devices 13 to change the state and/or to execute an activity. Thus, for example, each one of the one or more installed devices 13 is able to transmit data on its state, activities, occurred errors, and/or functioning. Further, each one of the one or more installed devices 13 is able to receive commands to change the state and/or to execute an activity. A command comprises, for example, one or more state changes and/or one or more activities to be executed by the respective installed device 13 receiving the command. If an installed device 13 is a lighting device, e.g. a LED, a command is arranged, for example, to initiate the execution of at least one of the following state changes/activities by the lighting device 13: dimming; dimming to a predetermined dimming level; change a light color; change the light color to a predetermined light color; change a light temperature; change the light temperature to a predetermined light temperature; blink; blink a predetermined number of times; switch on; switch off; output an audible signal. Of course, the present invention is not limited to the above-mentioned exemplary activities or state changes respectively.

According to the present embodiment, the commissioning device 11 is arranged for connecting with a communication module 112. For example, the commissioning device 11 comprises the communication module 112 (e.g., the communication module 112 is insertable into the commissioning device) or the communication module 112 is attachable to the commissioning device 11. According to an embodiment of the present invention, the commissioning device 11 and the communication module 112 are connected via a universal serial bus (USB) interface. However, also further appropriate connections may be utilized according to the present invention.

Independent of the concrete implementation of the connection of the communication module 112 and the commissioning device 11, the communication module 112 is arranged to enable the commissioning device 11 to transmit to the one or more installed devices 13 commissioning relevant messages via the Thread network protocol. The commissioning device 11 is, for example, a portable and/or mobile device (e.g. laptop, smartphone, tablet, etc.) that, by communicating with the installed devices 13, detects whether or not the installed devices 13 have been installed successfully.

Since the message transmission is executed according to the Thread network protocol, the communication module 112 is a Thread-enabled communication module 112, and the installed devices 13 are Thread-enabled devices 13. For example, the communication module 112 is an IEEE 802.15.4 standard enabled communication module 112, and the installed devices 13 are IEEE 802.15.4 standard enabled devices 13. I.e. both the communication module 112 and the installed devices 13 are arranged to communicate according to the IEEE 802.15.4 standard.

According to the present embodiment, the commissioning device 11 transmits a connectivity verification message to the one or more installed devices 13 via the communication module 112. The communication module 112 transmits the connectivity verification message via multiple (i.e. at least one or two) channels. This is visualized in FIG. 1 by the interrupted arrows leading from the communication module 112 to the installed devices 13. As mentioned, the transmission is executed according to the Thread communication protocol (e.g., via a Thread radio). The connectivity verification message is transmitted without addressing one or more particular installed devices 13. Thus, the connectivity verification message allows detecting installed devices 13 that are in the proximity of the communication module 112 or of the commissioning device 11 respectively. In this way, no exact knowledge on the exact locations of the installed devices 13 is mandatory. By transmitting the connectivity verification message, the commissioning device 11 or the communication module 112 respectively will reach all installed devices 13 that are in the proximity of the communication module 112 or of the commissioning device 11 respectively. The proximity of the communication module 112 or of the commissioning device 11 respectively is adjustable. Particularly, it is adjusted by defining a signal strength that has to be achieved when an installed device 13 receives the connectivity verification message. A commissioner operating the commissioning device 11 and moving through the area, in which the devices 13 have been installed, will thus be able to reach all devices 13 installed in that area.

The transmission of the connectivity verification message may be executed automatically (e.g. periodically and/or continuously) and/or on a user/commissioner command. For the implementation of the latter case, the commissioning device 11 comprises a user interface arrangement 111, by use of which the user/commissioner can input a command for starting the transmission of the connectivity verification message. The user interface arrangement 111 recognizes, then, the user input or command respectively and triggers the transmission of the connectivity verification message to the one or more installed devices 13. Particularly, the user interface arrangement 111 triggers the communication module 112 (e.g., by sending a corresponding trigger signal to the communication module 112) to transmit the connectivity verification message to the one or more installed devices 13.

The user interface arrangement 111 is arranged to receive inputs from the user/commissioner. According to a further embodiment, the user interface arrangement 111 is also arranged to visualize information to the user/commissioner. The user interface arrangement 111 may be arranged in different appropriate ways. For example, the user interface arrangement 111 comprises at least one of the following: one or more display units, one or more buttons, one or more keys, a keypad etc. A display unit of the user interface arrangement 111 may be arranged, for example, as a touchscreen.

As mentioned, the communication module 112 transmits the connectivity verification message via multiple transmission channels without knowing which installed devices 13 will receive the connectivity verification message.

After the installation, each one of the installed devices 13 monitors received messages. I.e. each one of the installed devices 13 listens to messages transmitted to it. According to the present embodiment, each one of the installed devices 13 monitors received messages that have been received via a particular transmission channel. In this way, it is ensured that the installed devices 13 will not overlook the connectivity verification message because only one channel of the plurality of transmission channels is predetermined for the reception of the connectivity verification message.

In response to the reception of a message (e.g., via the predetermined channel), the installed device 13 determines whether or not the received message is a connectivity verification message. The connectivity verification message is, for example, characterized by a predetermined format and/or content. Additionally, the installed device 13 determines whether or not a signal strength of the received message is above a predetermined threshold. As mentioned, this determination can be equated with the determination of whether or not the installed device 13 is in the proximity of the commissioning device 11. The order of the two determination steps is arbitrary. Moreover, according to an embodiment, both determination steps may be executed also in parallel. According to a further embodiment, if the two determination steps are executed sequentially and if the determination executed first returns a negative answer, the second determination may be omitted.

If both determination steps return a positive answer, i.e. if the received message is a connectivity verification message that has been transmitted according to Thread network protocol and if the signal strength of the received message is above the predetermined threshold, the installed device 13 executes a predetermined activity. The predetermined activity is predetermined especially for the commissioning purpose.

If the installed device 13 is, for example, a lighting device such as LED, the predetermined activity comprises according to an embodiment, for example, at least one the following: dimming (e.g., to an arbitrary level); dimming to a predetermined level; change the light color (e.g., to an arbitrary color); change the light color to a predetermined light color; change the light temperature (e.g., to an arbitrary light temperature); change the light temperature to a predetermined light temperature; blink; blink a predetermined number of times; switch on; switch off; output an audible signal.

According to an embodiment, the predetermined activity is executed by the installed device 13 for a predetermined time.

According to a further embodiment, the connectivity verification message comprises at least one of the following: an activity indication, indicating the predetermined activity; a time indication, indicating the time duration for executing the predetermined activity. Thus, the installed device 13 will know which activity has to be executed and/or how long the activity has to be executed from the received connectivity verification message. In this case, also parameters such as the predetermined dimming level, predetermined light color predetermined light temperature, predetermined number of blink times, audible signal to be output may be provided with, i.e. comprised in the connectivity verification message.

According to an embodiment, at least one of the following: the predetermined activity, the predetermined time, said parameters, is pre-specified in the installed device 13 (e.g. during manufacturing of the device 13 or during the installation of the device 13).

Here, also an implementation is possible where a part of the information on the predetermined activity, the predetermined time, and/or said parameters is provided with the connectivity verification message and where another part of said information is pre-specified in the installed device 13 (e.g. during manufacturing of the device 13 or during the installation of the device 13).

Thus, if an installed device 13 receives the connectivity verification message with a signal strength that is above a predetermined threshold, the commissioner, i.e. the user of the commissioning device 11 will recognize that the installed device 13 is installed correctly because the installed device 13 executes the predetermined activity selected for the commissioning purpose as desired.

Further, if the received message is a connectivity verification message and has a signal strength that is above the predetermined threshold, according to the present embodiment, the installed device 13 is configured to transmit a commissioning information message to a managing device 12. This is visualized in FIG. 1 by the arrows leading from the installed devices 13 to the managing device 12. According to the present embodiment, also the commissioning information message is transmitted based on the Thread network protocol (e.g., via a Thread radio). Thus, also the managing device 12 is a Thread-enabled device.

The managing device 12 is arranged to manage and/or monitor the operation of the installed devices 13. According to the present embodiment, the managing device 12 is further arranged to support the execution of the commissioning of the one or more installed devices 13.

The commissioning information message comprises, for example, an indication on whether the commissioning of the installed device 13 that transmitted the commissioning information message succeeded or failed. For example, the commissioning information message comprises the signal strength of the connectivity verification message that has been received by the installed device 13 and/or an indication on whether or not the signal strength is above the predetermined threshold.

In this way, the managing device 12 receives information on the state of the commissioning of the one or more installed devices 13. The managing device 12 is further able to generate an overview and/or map on the one or more installed devices 13 where, with regard to each one of the one or more installed devices 13, it is noted whether the commissioning was successful or failed and whether or not a commissioning has been executed with regard to the installed device 13. If the commissioning information message comprises the signal strength of the connectivity verification message that has been received by the installed device 13, the managing device 12 itself may determine whether or not the signal strength is above the predetermined threshold, i.e. whether or not the respective installed device 13 was in the proximity of the commissioning device 11 and was a subject of the commissioning process.

Further, according to the present embodiment, the managing device 12 is configured to transmit to the commissioning device 11 a commissioning status message indicating whether or not an installed device 13 received the connectivity verification message with a signal strength that is above a predetermined threshold.

Additionally, according to the present embodiment, the managing device 12 transmits to the commissioning device 11 also the overview and/or map on the one or more installed devices 13 where, with regard to each one of the one or more installed devices 13, it is noted whether the commissioning was successful or failed and whether a commissioning has been executed with regard to the installed device 13.

According to an embodiment, the managing device 12 transmits to the commissioning device 11 the whole overview and/or map on the one or more installed devices 13 at the beginning of the commissioning process. Later on, during the commissioning process, the managing device 12 transmits to the commissioning device 11 commissioning status messages each one of them indicating a set of installed devices 13 that received the connectivity verification message with a signal strength that is above a predetermined threshold. Thus, the commissioning device 11 only needs to update the information on commissioned installed devices 13. This reduces resources required for the communication between the managing device 12 and the commissioning device 11.

The transmission of the one or more commissioning status messages is executed, for example, continuously, periodically and/or in response to a reception of a predetermined number of commissioning information messages from installed devices 13.

Thus, the managing device 12 is also arranged to provide to the commissioning device 11 information on the current commissioning status, i.e. on installed devices 13, which have been commissioned successfully, commissioning of which failed, and/or commissioning of which has to be executed.

In this way, the commissioning device 11 is able to visualize the current commissioning situation to the user/commissioner. For example, the commissioning device 11 visualizes the overview and/or map on the one or more installed devices 13 via the user interface arrangement 111.

According to an embodiment, the user interface arrangement 111 is arranged to visualize the installed devices 13. The installed devices 13 may be visualized according to the location of the commissioning device 11. E.g. only installed devices 13 that are in a predetermined proximity of the commissioning device 11 can be visualized by the user interface arrangement 111. Alternatively, all installed devices 13 are visualized by the user interface arrangement 111, and the user has the possibility to zoom in or zoom out in a visualized map/arrangement of installed devices 13 as desired.

By use of the user interface arrangement 111, the user of the commissioning device 11 is capable to indicate one or more installed devices 13. Then, the user of the commissioning device 11 or the commissioner respectively is capable to input further device-relevant data and/or request further device-relevant data. The data input by the user/commissioner will then be transmitted to the managing device 12 by the commissioning device 11. The data requests are also transmitted to the managing device 12, wherein, in response to each request, the managing device 12 will transmit the requested data to the commissioning device 11.

The communication between the commissioning device 11 and the managing device 12 is done by use of any appropriate communication protocol. The managing device 12 is, for example, a computing device that is arranged for: communication with installed devices 13 (e.g. via the Thread network protocol), communication with the commissioning device 11 (via any one of available and appropriate communication protocols), storage of data (e.g., data on the installed devices 13), and processing of data (e.g., data on the installed devices 13). According to a further embodiment, the managing device 12 is a server device, for example, a local server device.

Thus, the present invention refers to a communication module 112 arranged to support execution of commissioning of one or more installed devices 13 and configured to transmit, according to Thread network protocol, via multiple channels a connectivity verification message arranged to initiate an execution of a predetermined activity by the one or more installed devices 13. Present invention concerns a commissioning device 11, transmitting the connectivity verification message to the one or more installed devices 13 via the communication module 112, and installed devices 13, each installed device 13 monitoring received messages, determining whether or not a received message is the connectivity verification message, determining whether or not a signal strength of the received message is above a predetermined threshold, if the received message is a connectivity verification message that has been transmitted according to Thread network protocol and if the signal strength of the received message is above the predetermined threshold, executing the predetermined activity. Further, the invention concerns a managing device 12 supporting the execution of said commissioning.

The invention has been described in conjunction with various embodiments herein. However, other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

LIST OF REFERENCE SIGNS 11 commissioning device
111 user interface arrangement
112 communication module
12 managing device
13 installed device

The invention claimed is:

1. A lighting system comprising:
one or more lighting system devices (13), each arranged to undergo a commissioning process after the installation of the device (13), wherein each of the one or more lighting system devices (13) is configured to:
monitor received messages,
determine whether or not a received message is a connectivity verification message that has been transmitted according to Thread network protocol,
determine whether or not a signal strength of the received message is above a predetermined threshold, and
if the received message is a connectivity verification message that has been transmitted according to Thread network protocol and if the signal strength of the received message is above the predetermined threshold, execute a predetermined activity;
a mobile commissioning device (11) configured to execute commissioning of the one or more installed lighting system devices;
a communication module (112) connected to the mobile commissioning device (11) to support the commissioning of the one or more installed lighting system devices (13), wherein the communication module (112) is configured to transmit from the mobile commissioning device (11) to the one or more installed lighting system devices (13), according to Thread network protocol, said connectivity verification message via multiple channels, and wherein the connectivity verification message is arranged to initiate an execution of the predetermined activity by the one or more installed lighting system devices; and
a managing device (12) arranged to support the commissioning of said one or more installed devices of the lighting system, wherein the managing device is configured to:
receive from the respective installed one or more lighting system device (13) a commissioning information message, wherein the commissioning information message indicates the signal strength of the connectivity verification message received at the installed lighting system device from the commissioning device (11), and
transmit to the commissioning device (11) a commissioning status message indicating whether or not the respective installed lighting system device (13) received the connectivity verification message with a signal strength that is above a predetermined threshold.

2. The lighting system according to claim 1, wherein the device is configured to monitor messages that have been received via a predetermined channel.

3. The lighting system according to claim 1 wherein the predetermined activity comprises at least one of the following:
dimming;
dimming to a predetermined dimming level;
change a light color;
change the light color to a predetermined light color;
change a light temperature;
change the light temperature to a predetermined light temperature;

blink;
blink a predetermined number of times;
switch on;
switch off;
output an audible signal.

4. The lighting system according to claim 1, wherein the lighting system device is configured to execute the predetermined activity for a predetermined time.

5. The lighting system according to claim 1, wherein, if the received message is a connectivity verification message that has been transmitted according to Thread network protocol and if the signal strength of the received message is above the predetermined threshold, the lighting system device is configured to transmit a commissioning information message to the managing device.

6. The lighting system according to claim 5, wherein the commissioning information message indicates the signal strength of the received message.

7. The lighting system according to claim 1, wherein the commissioning device comprises a user interface arrangement (111) configured to trigger the transmission of the connectivity verification message to the one or more installed devices (13).

8. The lighting system according to claim 7, wherein the user interface arrangement (111) is configured to receive user input and to trigger the transmission of the connectivity verification message according to the user input.

9. The lighting system according to claim 7, wherein the user interface arrangement (111) is configured to visualize information on the installed devices (13).

10. The lighting system according to claim 1, wherein the commissioning device (11) is configured to receive a commissioning status message from the managing device (12), wherein the commissioning status message indicates a set of installed devices of the one or more installed devices that received the connectivity verification message with a signal strength that is above a predetermined threshold.

11. A commissioning device configured to execute commissioning of one or more installed devices of a lighting system, wherein:
the commissioning device is arranged for connection with a communication module (112) and to transmit a connectivity verification message to the one or more installed devices via the communication module;
the communication module (112) is arranged to support an execution of a commissioning of said one or more installed devices (13), and is configured to transmit, according to Thread network protocol, the connectivity verification message via multiple channels, and further wherein the connectivity verification message is arranged to initiate an execution of a predetermined activity by the one or more installed devices;
the commissioning device (11) is configured to receive a commissioning status message from a managing device (12), and further wherein the commissioning status message indicates a set of installed devices of the one or more installed devices that received the connectivity verification message with a signal strength that is above a predetermined threshold; and
the commissioning device has a user interface arrangement (111) that is configured to visualize the set of installed devices (13).

* * * * *